Patented Feb. 22, 1949

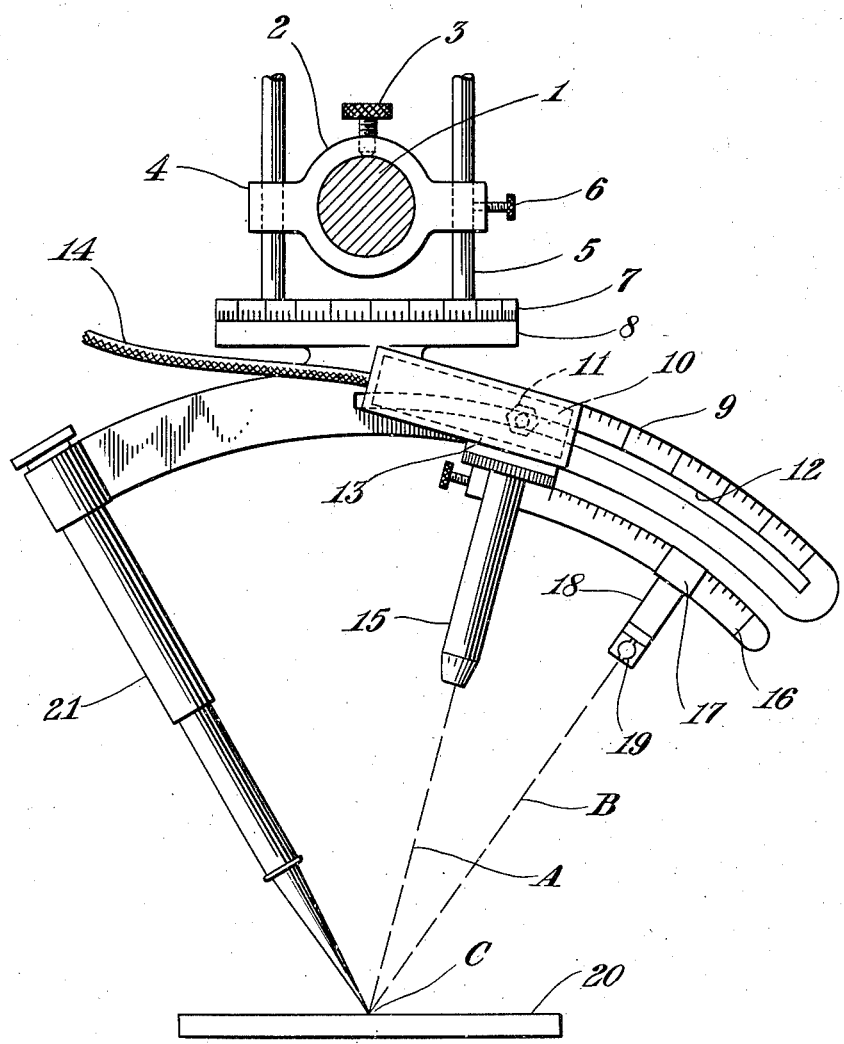

2,462,374

UNITED STATES PATENT OFFICE 2,462,374

STRESS ANALYSIS BY X-RAY DIFFRACTION

Francis George Firth, New York, N. Y., assignor, by mesne assignments, to Philips Laboratories, Inc., Irvington on Hudson, N. Y., a corporation of Delaware Application October 4, 1944, Serial No. 557,163

12 Claims. (Cl. 250—83.6)

This invention relates to X-rays, and more particularly to methods and apparatus for stress analysis by X-ray diffraction.

Internal stresses are present in many materials, such as castings, welds, rolled sections, formed plates, and age-hardened materials. Also, certain mechanical parts are subject to high stress conditions in use, examples being moving parts in rotating machinery, propeller shafts, turbine blades, bridges, high-pressure boilers and pressure lines, aircraft landing gear and numerous other assemblages.

Conventional methods of stress analysis do not lend themselves to the easy determination of stress, especially in cases where the part has been stressed without suitable strain gages being in place. Moreover, most of these methods are destructure.

Recently attempts have been made to determine residual stress by way of X-ray diffraction analysis. One of several advantages expected from the various X-ray methods proposed was the nondestructive character thereof. All of these methods relied on the displacement of certain back reflection lines obtained on film for their determination. While theoretically superior to existing methods, the proposed procedures, in practice, created new difficulties caused by the poor resolution of the film, its shrinkage, and the necessity of very accurate measurement. Also, the time factor was found to be excessively long for each location on the specimen at which stresses are to be measured.

It is an object of the present invention to provide methods and apparatus for stress analysis by X-ray diffraction which eliminate the difficulties inherent in X-ray methods and devices as heretofore proposed for this purpose, and which thus are superior to existing X-ray methods and apparatus as well as to the more conventional types of stress analysis.

It is another object of the invention to provide methods and apparatus for stress analysis by X-ray diffraction of greatly improved accuracy as compared with existing techniques.

A further object of the invention is to provide methods and apparatus for stress analysis by X-ray diffraction which materially increase the speed of operation, reducing the time factor from several hours to a few minutes.

Still another object of the invention is the elimination of film with its attendant shrinkage and poor resolution, and the substitution therefor of methods and apparatus for stress analyis by X-ray diffraction supplying a record not subject to variation and thus yielding completely reproducible results.

A still further object of the invention is to facilitate standardization of stress analysis by X-ray diffraction by the use of procedures and equipment lending itself to precise calibration.

Other objects, and the manner in which the same are attained, will appear from the following description.

Stress analysis by X-ray diffraction involves measuring the interatomic distance in metallic crystals and using this distance as a gage length in the determination of stress. Normal spacings are fundamental characteristics of each material and in the absence of stress, are uniform in all directions. On deformation by stress, however, the interatomic spacings vary in different directions, and determination of these variations as to direction and amount yields as precise a qualitative and quantitative record of the stress causing the deformation as technique and instrumentalities are able to supply.

Various techniques approaching the problem from different theoretical considerations have been proposed. The present invention proceeds on the basis of a method generally known as the "oblique" method which involves two types of measurements of spacings, one normal to the surface and the other in a direction inclined to the surface at a known angle. The difference between the spacings obtained from the two measurements permits calculating the stress component acting in a plane defined by the normal and the direction of said component.

In the case of iron or other ferrous metals, the present invention may utilize a technique whereby after removal of the surface effects of cold working, e. g. by electrolytical etching, a thin layer of colloidal or finely powdered gold is applied. Measurement normal to the surface of the unstressed patterns from gold and iron yields a reference scale for comparison with a stressed condition as measured in the oblique position. Whereas in the unstressed condition the lines of gold and iron are concentric circles, in the stressed condition the lines are no longer concentric but are distorted in the direction of stress so they are spaced more closely together on one, and more widely apart on the opposite side, the direction and amount of this displacement corresponding to the direction and amount of the stress under investigation.

The present invention contemplates methods involving scanning of the area subject to examination by measuring the quanta of radiation obtained by back reflection, and correspondingly, apparatus including a Geiger-Mueller tube so associated with the source of X-rays as to operate in precise, predetermined and accurately reproducible relationship thereto at all times. In relying on the measurement of quanta of radiation rather than on photographic recording, and in eliminating a film with its inherent shrinkage, excessive exposure time, lack of reproducibility and difficulty of standardization and introducing in its place a Geiger-Mueller counter yielding precise and reproducible results in itself and so arranged for mutual cooperation with the X-ray tube as to render this relationship precise and reproducible, the present invention succeeds in attaining the manifold objectives enumerated above.

In the drawing accompanying this specification and forming part thereof, one embodiment of the invention is shown diagrammatically by way of example, but I wish it to be understood that I do not desire to be limited to the exact details of construction, design and operation shown and described, as modifications within the scope of the appended claims may occur to a person skilled in the art.

Referring now to the drawing, which is a diagrammatic top view of a preferred embodiment of the invention, this shows a vertical positioning stand 1 which mounts for sliding vertical adjustment, a height clamp 2 which is secured in any desired position on the stand by means of a set screw 3. The height clamp 2 mounts two e. g. tubular guide members 4 which support, for sliding horizontal adjustment, two rods or bars 5 which are secured in any desired position in the guides by means of another set screw 6 and which mount, at one extremity, a graduated circle 7 bearing markings from 0° to 360°.

Mounted on the graduated circle 7 for rotary displacement relative thereto is a bearing mount 8 carrying a graduated 45° arc-shaped track 9 which may be rotated about the axis of bearing mount 8, its angular position relative to the graduated circle 7 being indicated by a suitable mark on the arc. This graduated arc 9 mounts for slidable adjustment along the entire length thereof, a rider 10 which, for example, may have a screw member 11 traveling in a slot 12 provided in the arc-shaped track, the screw serving to secure the rider in any desired position on the 45° arc-shaped track. The rider 10 mounts an X-ray tube housing 13 containing a tube (not shown) and connected with an associated power unit (not shown) by flexible cables 14, and if liquid cooling is employed, also by flexible conduits (not shown) for the cooling medium. As it is fixed on the rider 10 the X-ray tube housing 13 may assume any desired position along the 45° arc-shaped track, its angular position relative to the arc-shaped track being indicated by a suitable mark on the housing which should coincide with the axis of the X-ray beam emitted by the tube.

Attached to the face of the X-ray tube housing 13 and extending in coaxial relationship with respect to the X-ray beam is a long collimator tube 15 which also serves as a bearing mount for a graduated 30° arc-shaped track 16 which can be rotated around the collimator tube 15, the relative rotary displacement being indicated by a 360° scale fixed to the arc-shaped track which cooperates with a suitable mark on the collimator tube.

The 30° arc-shaped track 16 mounts a carriage 17 which may be displaced to assume any desired position on the arc-shaped track and which, in turn, carries a Geiger-Mueller tube housing 18 and a slit system 19 associated with the tube housing in a known manner.

According to the invention the specimen 20 is observed and spotted and the apparatus is adjusted to assume such a position that the point under investigation is located in the center of the concentric circles defined by the 45° and 30° arcs 9 and 16, respectively, by means of a retractable gage pointer 21 mounted e. g. on an extension of the 45° arc. In this case the axis A of the X-ray tube housing 13 and its associated collimator tube 15, and the axis B of the Geiger-Mueller tube housing 18 and its associated slit system 19, intersect at the point under analysis C at all times, no matter what the positions of the X-ray tube housing 13 and the Geiger-Mueller tube housing 18 on their respective arc-shaped tracks 9 and 16 may be.

The position of the Geiger-Mueller tube on the graduated 30° arc-shaped track 16 may be adjusted manually to be read on the 30° scale, or else this position may be varied by a synchronous motor (not shown) which moves the Geiger-Mueller tube on the 30° arc at a predetermined rate of speed, in synchronism with the recording paper of an electrical recorder (not shown) forming part of such circuits and instrumentalities as are electrically connected with the Geiger-Mueller tube for the purpose of determining and recording the intensity of the reflected radiation for any angular position of the tube.

Procedure and operation of the method and apparatus according to the invention are exemplified in the following example which involves a typical application of stress analysis by means of X-ray diffraction.

Suppose the material under analysis is iron or another ferrous metal. In this case it is desirable, though not essential, to have cobalt as the X-ray tube target and to use the $K_{\alpha 1, \alpha 2}$ characteristic radiation from cobalt as the effective X-ray radiation. The surface of the specimen area to be analyzed is electrolytically etched to a depth of about .005" to remove surface effects of cold working. A thin layer of colloidal or finely powdered gold or another suitable internal standard in the form of a paint or lacquer is then applied. The X-ray tube 13 is now so adjusted that the beam through the collimator is normal to the surface of the ferrous specimen 20 which is placed at the center of the concentric circles defined by the 45° and 30° arcs 9 and 16, respectively. The proper location for the specimen area under analysis is established by the retractable gage pointer which is retracted during operation of the stress analysis apparatus.

With the X-ray beam striking the specimen normal to the surface, the 0.904 Å. lines from the (310) plane of iron will appear at about 16.6° and 15° as a resolution of the $K_{\alpha 1 \alpha 2}$ of cobalt, i. e. corresponding intensities will be recorded by the Geiger-Mueller tube 18 when shifted to about the 16° mark on the 30° arc.

The unstressed lines from the (420) plane of gold have a value of 0.910 Å. and will appear at 21.0° and 19.2°, i. e. when the Geiger-Mueller tube is shifted to about the 20° mark on the 30° arc.

This approximate 4° difference between the unstressed lines from gold and iron establishes a reference scale for comparison with a stressed condition. This may be recorded directly on a chart recorder, or by plotting intensity vs. angular position of the lines, and determining the centers of the gold and iron line peaks.

Now the X-ray beam is moved to the 45° oblique position, by a corresponding shift of the X-ray tube 13 on the 45° arc 9, and a plot is made with the X-ray tube in this new position. Inasmuch as the Geiger-Mueller tube 18 can be moved around the axis A of the X-ray beam, any distortion of the iron lattice can be analyzed in regard to direction as well as magnitude.

By methods well known to those skilled in the art, the stresses existing at the point of investigation can be computed from the observations made at the normal and oblique positions.

By appropriate progression or tube shift over a given area, a stress strain map can be drawn on the surface under analysis which constitutes a precise, reproducible record of stress conditions in the specimen part analyzed.

I claim:

1. Apparatus for stress analysis by X-ray diffraction, comprising an X-ray tube for generating a beam of X-radiation, means to collimate said generated beam of X-radiation into a sharply defined beam of X-radiation, an arc-shaped track arranged for rotary displacement relative to said X-ray tube around an axis defined by the collimated beam of X-radiation, a Geiger-Mueller tube movable along said track and arranged to intercept a reflected beam of X-radiation, and means to collimate said reflected beam of X-radiation before it is intercepted by said Geiger-Mueller tube.

2. Apparatus for stress analysis by X-ray diffraction, comprising an X-ray tube within a housing for generating a beam of X-radiation, a collimator tube mounted on said housing for collimating said X-ray beam, an arc-shaped track mounted on said collimator tube for rotary displacement around the axis thereof, a Geiger-Mueller tube movable along said track and arranged to intercept a reflected beam of X-radiation, and collimating means for collimating said reflected beam of X-radiation before it is intercepted by said Geiger-Mueller tube.

3. Apparatus for stress analysis by X-ray diffraction, comprising a housing, an X-ray tube within the housing for generating an X-ray beam, a collimator tube mounted on said housing, a graduated arc-shaped track mounted on said collimator tube for rotary displacement around the axis thereof, a second housing movable along said track, a Geiger-Mueller tube within said second housing, and a slit system mounted on said Geiger-Mueller tube housing, the axis of said slit system and the axis of said collimator tube intersecting at the center of the circle defined by said arc-shaped track regardless of the relative positions of said X-ray and said Geiger-Mueller tube housings.

4. Apparatus for stress analysis by X-ray diffraction, comprising a first arc-shaped track, an X-ray tube for generating a beam of X-radiation movable along said first track, means to collimate said generated beam of X-radiation into a sharply defined beam of X-radiation, a second arc-shaped track concentric with said first track and arranged for rotary displacement relative to said housing around an axis defined by the X-ray beam, a Geiger-Mueller tube movable along said second track and arranged to intercept a reflected beam of X-radiation, and means to collimate said reflected beam of X-radiation before it is intercepted by said Geiger-Mueller tube.

5. Apparatus for stress analysis by X-ray diffraction, comprising a first arc-shaped track, an X-ray tube within a housing movable along said first track for generating a beam of X-radiation, a collimator tube mounted on said housing for collimating said X-ray beam, a second arc-shaped track mounted on said collimator tube for rotary displacement around the axis thereof, a Geiger-Mueller tube movable along said second track and arranged to intercept a reflected beam of X-radiation, and means to collimate said reflected beam of radiation before it is intercepted by said Geiger-Mueller tube.

6. Apparatus for stress analysis by X-ray diffraction, comprising a first graduated arc-shaped track, a housing movable along said first track, an X-ray tube within said housing for generating an X-ray beam, a collimator tube mounted on said housing, a second graduated arc-shaped track mounted on said collimator tube for rotary displacement around the axis thereof, a second housing movable along said second track, a Geiger-Mueller tube within said second housing, and a slit system mounted on said Geiger-Mueller tube housing, the axis of said slit system and the axis of said collimator tube intersecting at the center of the circles defined by said arc-shaped tracks regardless of the relative positions of said X-ray and said Geiger-Mueller tube housing.

7. Apparatus for stress analysis by X-ray diffraction, comprising a stand, a first arc-shaped track mounted for rotary displacement on said stand, an X-ray tube within a housing movable along said first track, a collimator tube mounted on said housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

8. Apparatus for stress analysis by X-ray diffraction, comprising a stand, a first arc-shaped track mounted for rotary displacement in vertical and horizontal directions on said stand, an X-ray tube within a housing movable along said first track, a collimator tube mounted on said housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

9. Apparatus for stress analysis by X-ray diffraction, comprising a stand, a clamp mounted for longitudinal displacement on said stand, a first arc-shaped track mounted for rotary displacement on said clamp, an X-ray tube within a housing movable along said first track, a collimator tube mounted on said X-ray tube housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

10. Apparatus for stress analysis by X-ray diffraction, comprising a stand, a clamp mounted for longitudinal and rotary displacement on said stand, a first arc-shaped track mounted for rotary displacement on said clamp, an X-ray tube within a housing movable along said first track, a collimator tube mounted on said X-ray tube housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

11. Apparatus for stress analysis by X-ray diffraction, comprising a stand, a clamp mounted for displacement on said stand, a member mounted on said clamp for displacement normal to said stand, a first arc-shaped track mounted for rotary displacement on said member, an X-ray tube within a housing movable along said first track, a collimator tube mounted on said X-ray tube housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

12. Apparatus for stress analysis by X-ray diffraction, comprising a stand, a clamp mounted for displacement on said stand, guide members mounted on said clamp, rod-shaped support members mounted in said guide members for displacement normal to said stand, a graduated circle mounted on said support members, a first arc-shaped track mounted for rotary displacement on said circle, an X-ray tube within a housing movable along said first track, a collimator tube mounted on said X-ray tube housing, a second arc-shaped track mounted on said collimator tube for rotary displacement around the axis thereof, a Geiger-Mueller tube within a housing movable along said second track, and a slit system mounted on said Geiger-Mueller tube housing, the axis of said slit system and the axis of said collimator tube intersecting at the center of the circles defined by said arc-shaped tracks regardless of the relative positions of said X-ray tube and said Geiger-Mueller tube housings.

FRANCIS GEORGE FIRTH.

REFERENCES CITED

The following references are of record in the file of this patent:

UNITED STATES PATENTS

| Number | Name | Date |
| --- | --- | --- |
| 2,184,174 | Bertram | Dec. 19, 1939 |
| 2,259,708 | Schiebold | Oct. 21, 1941 |
| 2,319,350 | Schiebold | May 18, 1943 |
| 2,380,235 | Harker | July 10, 1945 |
| 2,386,785 | Friedman | Oct. 16, 1945 |